US010018509B2

United States Patent
Matusewicz et al.

(10) Patent No.: US 10,018,509 B2
(45) Date of Patent: Jul. 10, 2018

(54) APPARATUS FOR TEMPERATURE MEASUREMENTS OF A MOLTEN BATH IN A TOP SUBMERGED INJECTION LANCE INSTALLATION

(71) Applicant: OUTOTEC (FINLAND) OY, Espoo (FI)

(72) Inventors: Robert W. Matusewicz, Oakleigh (AU); John Robyn Grant, Alexandra (AU)

(73) Assignee: Outotec (Finland) Oy, Espoo (FI)

( * ) Notice: Subject to any disclaimer, the term of this patent is extended or adjusted under 35 U.S.C. 154(b) by 393 days.

(21) Appl. No.: 14/783,233

(22) PCT Filed: Apr. 11, 2014

(86) PCT No.: PCT/IB2014/060638
§ 371 (c)(1),
(2) Date: Oct. 8, 2015

(87) PCT Pub. No.: WO2014/167532
PCT Pub. Date: Oct. 16, 2014

(65) Prior Publication Data
US 2016/0069748 A1  Mar. 10, 2016

(30) Foreign Application Priority Data
Apr. 12, 2013 (AU) ................................ 2013204818

(51) Int. Cl.
*F16M 13/02* (2006.01)
*G01K 1/12* (2006.01)
(Continued)

(52) U.S. Cl.
CPC ............ *G01J 5/004* (2013.01); *C21C 5/4673* (2013.01); *F27B 3/28* (2013.01); *F27D 21/0014* (2013.01);
(Continued)

(58) Field of Classification Search
CPC .... G01J 5/00; G01K 1/12; G01K 1/14; F16M 13/02; Y02P 10/214
(Continued)

(56) References Cited

U.S. PATENT DOCUMENTS 2,054,382 A * 9/1936 Larsen ..................... G01J 5/061
236/15 R
2,102,955 A * 12/1937 Hulme ....................... G01J 5/02
136/213

(Continued)

FOREIGN PATENT DOCUMENTS

CN          101009042 B    8/2007
EP          2290310 A1     3/2011
(Continued)

OTHER PUBLICATIONS

Notification of the First Office Action prepared by the State Intellectual Property Office of the People's Republic of China for CN 201480023504.3, dated Aug. 31, 2016, 18 pages.
(Continued)

*Primary Examiner* — Gail Kaplan Verbitsky
(74) *Attorney, Agent, or Firm* — Chernoff Vilhauer LLP

(57) ABSTRACT

A temperature measuring apparatus for a top submerged lancing installation, for use in measuring the temperature of a molten bath that includes a slag phase, during a pyrometallurgical operation conducted in a reactor of the installation, includes a top submerged injecting top submerged injecting lance having at least an outer pipe and an inner pipe. A bore is defined by the inner pipe and an annular passage is defined in part by an inner surface of the outer pipe. The apparatus further includes a pyrometer device of which at least a sensor head part is mounted in relation to the top submerged injecting lance and operable both to receive infrared energy passing longitudinally within the lance from an outlet end of the lance. The sensor head part also is
(Continued)

operable to focus the received infrared energy to enable generation of an output signal or display indicative of the temperature of a molten bath in which an outlet end portion of the lance is submerged and from which the infrared energy is received.

19 Claims, 5 Drawing Sheets

(51) Int. Cl.
    *G01K 1/14*     (2006.01)
    *G01J 5/00*     (2006.01)
    *C21C 5/46*     (2006.01)
    *F27B 3/28*     (2006.01)
    *F27D 21/00*     (2006.01)
    *G01K 13/00*     (2006.01)
    *C21C 5/52*     (2006.01)
    *F27D 19/00*     (2006.01)

(52) U.S. Cl.
    CPC ...... *G01K 13/00* (2013.01); *C21C 2005/5288* (2013.01); *F27D 2019/0003* (2013.01); *Y02P 10/216* (2015.11)

(58) Field of Classification Search
    USPC ..................................................... 702/6, 11
    See application file for complete search history.

(56) References Cited

U.S. PATENT DOCUMENTS

| | | | | |
|---|---|---|---|---|
| 2,465,322 A * | 3/1949 | Considine | ............... | G01J 5/041 136/216 |
| 3,452,598 A * | 7/1969 | Jones, Jr. | ............... | G01J 5/0037 374/126 |
| 3,723,096 A * | 3/1973 | Parlee et al. | ............... | C22B 5/00 420/115 |
| 3,757,579 A * | 9/1973 | Smejkal | ............... | G01K 7/04 374/140 |
| 3,813,943 A * | 6/1974 | Fradeneck | ............... | G01K 1/14 136/230 |
| 4,251,271 A | 2/1981 | Floyd | | |
| 4,433,832 A * | 2/1984 | Butts | ............... | C21C 5/4613 266/225 |
| 4,737,038 A * | 4/1988 | Dostoomian | ............... | G01J 5/0037 250/577 |
| 4,762,571 A * | 8/1988 | Kaufman | ............... | G01K 7/025 136/234 |
| 5,011,297 A * | 4/1991 | Tittl | ............... | G01B 5/0014 33/560 |
| 5,308,043 A * | 5/1994 | Floyd | ............... | C21C 5/4613 266/225 |
| 5,498,277 A * | 3/1996 | Floyd | ............... | C21B 13/0026 75/385 |
| 5,772,324 A * | 6/1998 | Falk | ............... | G01K 1/125 136/232 |
| 6,053,632 A * | 4/2000 | Leininger | ............... | G01J 5/041 374/130 |
| 6,558,614 B1 | 5/2003 | Fritz | | |
| 7,140,765 B2 * | 11/2006 | Memoli | ............... | G01J 5/0044 374/140 |
| 7,597,736 B2 * | 10/2009 | Fleischanderl | ............... | C21B 3/06 75/10.35 |
| 8,623,114 B2 * | 1/2014 | George | ............... | C21C 5/4606 75/414 |
| RE44,850 E * | 4/2014 | Hughes | ............... | C22B 15/0054 75/640 |
| 9,829,250 B2 * | 11/2017 | Matusewicz | ............... | C21C 5/4613 |
| 2004/0240518 A1 * | 12/2004 | Memoli | ............... | G01J 5/0044 374/139 |
| 2005/0185695 A1 * | 8/2005 | Hollander | ............... | G01J 5/02 374/121 |
| 2012/0327971 A1 * | 12/2012 | Goda | ............... | G01J 5/004 374/140 |
| 2014/0102257 A1 * | 4/2014 | George | ............... | C21C 5/4606 75/649 |
| 2014/0327194 A1 * | 11/2014 | Matusewicz | ............... | C21C 5/4613 266/225 |
| 2016/0265848 A1 * | 9/2016 | Reuter | ............... | C21C 5/4613 |

FOREIGN PATENT DOCUMENTS

| | | | | |
|---|---|---|---|---|
| JP | 63-062812 A | | 3/1988 | |
| JP | 01246327 A | * | 10/1989 | |
| JP | 2003090524 A | | 3/2003 | |
| RU | 2148802 C1 | | 5/2000 | |
| WO | 97/22859 A1 | | 6/1997 | |
| WO | WO 9815664 A1 | * | 4/1998 | ............... C21C 7/10 |
| WO | 2013029092 A1 | | 3/2013 | |

OTHER PUBLICATIONS

Notice of Grounds for Rejection prepared by the Korean Intellectual Property Office for KR 2015-7030643, dated Aug. 23, 2016, 10 pages.
PCT, International Search Report for corresponding International Patent Application No. PCT/IB2014/060638, dated Jul. 21, 2014, pp. 4.
PCT, International Preliminary Report on Patentability for corresponding International Patent Application No. PCT/IB2014/060638, dated Apr. 14, 2015, pp. 15.
Jensen et al., "Lance-Based Sensing and Vision Systems", Iron & Steel Technology, AIST, Warrendale, PA, US, vol. 1, No. 1, Jan. 1, 2004, pp. 69-73, XP001196316, ISSN: 1547-0423.
Notification prepared by the Eurasian Patent Organization for Eurasian Patent Application No. 201591836/31 dated May 26, 2017, 4 pages.

* cited by examiner

APPARATUS FOR TEMPERATURE MEASUREMENTS OF A MOLTEN BATH IN A TOP SUBMERGED INJECTION LANCE INSTALLATION

CROSS-REFERENCE TO RELATED APPLICATIONS

This is a national stage application filed under 35 USC 371 based on International Application No. PCT/IB2014/060638 filed Apr. 11, 2014 and claims priority under 35 USC 119 of Finnish Patent Application No. 2013204818 filed Apr. 12, 2013.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

TECHNICAL FIELD

This invention relates to apparatus for temperature measurement in the course of a molten bath pyro-metallurgical operation conducted by a top submerged lancing injection process.

BACKGROUND OF THE INVENTION

Molten bath smelting or other pyro-metallurgical operations that require interaction between the bath and a source of oxygen-containing gas utilize several different arrangements for the supply of the gas. In general, these operations involve direct injection into molten matte/metal. This may be by bottom blowing tuyeres as in a Bessemer type of furnace or side blowing tuyeres as in a Peirce-Smith type of converter. Alternatively, the injection of gas may be by means of a lance to provide either top blowing or submerged Injection. Examples of top blowing lance injection are the KALDO and BOP/BOF steel making plants in which pure oxygen is blown from above the bath to produce steel from molten iron. Another example is provided by the Mitsubishi copper process, in which injection lances cause jets of oxygen-containing to be provided in the smelting and matte converting stages so as to impinge on and penetrate the top surface of the bath, respectively to produce and to convert copper matte. In the case of submerged lance injection, the lower end of the lance is submerged so that injection occurs within rather than from above a slag layer of the bath, to provide top submerged lancing injection, of which a well know example is the Outotec AUSMELT top submerged lancing technology that is applied to a wide range of metals processing.

With both forms of injection from above, that is, with both top blowing and top submerged lancing injection, the lance is subjected to intense prevailing bath temperatures. The top blowing in the Mitsubishi copper process uses a number of relatively small steel lances that have an inner pipe of about 50 mm diameter and an outer pipe of about 100 mm diameter. The inner pipe terminates at about the level of the furnace roof, well above the reaction zone. The outer pipe is rotatable to prevent it sticking to a water-cooled collar at the furnace roof, and it extends down into the gas space of the furnace to position its lower end about 500-800 mm above the upper surface of the molten bath. Particulate feed entrained in air is blown through the inner pipe, while oxygen enriched air is blown through the annulus between the pipes. Despite the spacing of the lower end of the outer pipe above the bath surface, and any cooling of the lance by the gases passing through it, the outer pipe burns back by about 400 mm per day. The outer pipe therefore is slowly lowered and, when required, new sections are attached to the top of the outer, consumable pipe.

The lances for top submerged lancing injection are much larger than those for top blowing, such as in the Mitsubishi process described above. A top submerged injecting lance usually has at least an inner and an outer pipe, as assumed in the following, but may have at least one other pipe concentric with the inner and outer pipes. Typical large scale top submerged injecting lances have an outer pipe diameter of 200 to 500 mm, or larger. Also, the lance is much longer and extends down through the roof of a top submerged lancing reactor that may be about 10 to 15 m tall, so that the lower end of the outer pipe is immersed to a depth of up to about 300 mm or more in a molten slag phase of the bath, but is protected by a coating of solidified slag formed and maintained on the outer surface of the outer pipe by the cooling action of the injected gas flow within. The inner pipe may terminate at about the same level as the outer pipe, or at a higher level of up to about 1000 mm above the lower end of the outer pipe. Thus, it can be the case that the lower end of only the outer pipe is submerged. In any event, a helical vane or other flow shaping device may be mounted on the outer surface of the inner pipe to span the annular space between the inner and outer pipes. The vanes impart a strong swirling action to an air or oxygen-enriched blast along that annulus and serve to enhance the cooling effect as well as ensure that gas is mixed well with fuel and feed material supplied through the inner pipe with the mixing occurring substantially in a mixing chamber defined by the outer pipe, below the lower end of the inner pipe where the inner pipe terminates a sufficient distance above the lower end of the outer pipe.

The outer pipe of the top submerged injecting lance wears and burns back at its lower end, but at a rate that is considerably reduced by the protective frozen slag coating than would be the case without the coating. However, this is controlled to a substantial degree by the mode of operation with top submerged lancing technology. The mode of operation makes the technology viable despite the lower end of the lance being submerged in the highly reactive and corrosive environment of the molten slag bath. The inner pipe of a top submerged injecting lance may be used to supply feed materials, such as concentrate, fluxes and reductant to be injected into a slag layer of the bath, or it may be used for fuel. An oxygen containing gas, such as air or oxygen enriched air, is supplied through the annulus between the pipes. Prior to submerged injection within the slag layer of the bath being commenced, the lance is positioned with its lower end, that is, the lower end of the outer pipe, spaced a suitable distance above the slag surface. Oxygen-containing gas and fuel, such as fuel oil, fine coal or hydrocarbon gas, are supplied to the lance and a resultant oxygen/fuel mixture is fired to generate a flame jet that impinges onto the slag. This causes the slag to splash to form, on the outer lance pipe, the slag layer that is solidified by the gas stream passing through the lance to provide the solid slag coating mentioned above. The lance then can be lowered to achieve injection within the slag, with the ongoing passage of oxygen-containing gas through the lance maintaining the lower extent of the lance at a temperature at which the solidified slag coating is maintained and protects the outer pipe.

A new top submerged injecting lance usually has relative positions for the lower ends of the outer and inner pipes that is an optimum for a particular pyro-metallurgical operating window determined during the design. The relative positions can be different for different uses of top submerged lancing processes. However, the length of any mixing chamber formed between the lower end of the inner pipe and that of the outer pipe progressively falls below an optimum for a given pyro-metallurgical operation as the lower end of the outer pipe slowly wears and burns back. Similarly, if there is zero offset between the lower ends of the outer and inner pipes, the lower end of the inner pipe can become exposed to the slag, and also being worn and subjected to burn back. At intervals, the lower end of at least the outer pipe needs to be cut to provide a clean edge to which is welded a length of pipe of the appropriate diameter, to re-establish the optimum relative positions of the pipe lower ends to optimise smelting conditions.

With both top blowing and top submerged injecting lances, there have been proposals for fluid cooling to protect the lance from the high temperatures encountered in pyrometallurgical processes. Examples of fluid cooled lances for top blowing are disclosed in US patents:

U.S. Pat. No. 3,223,398 to Bertram et al.,
U.S. Pat. No. 3,269,829 to Belkin,
U.S. Pat. No. 3,321,139 to De Saint Martin,
U.S. Pat. No. 3,338,570 to Zimmer,
U.S. Pat. No. 3,411,716 to Stephan et al.,
U.S. Pat. No. 3,488,044 to Shepherd,
U.S. Pat. No. 3,730,505 to Ramacciotti et al.,
U.S. Pat. No. 3,802,681 to Pfeifer,
U.S. Pat. No. 3,828,850 to McMinn et al.,
U.S. Pat. No. 3,876,190 to Johnstone et al.,
U.S. Pat. No. 3,889,933 to Jaquay.,
U.S. Pat. No. 4,097,030 to Desaar.,
U.S. Pat. No. 4,396,182 to Schaffar et al.,
U.S. Pat. No. 4,541,617 to Okane et al.; and
U.S. Pat. No. 6,565,800 to Dunne.

All of these references, with the exception of U.S. Pat. No. 3,223,398 to Bertram et al. and U.S. Pat. No. 3,269,829 to Belkin, utilise concentric outermost pipes arranged to enable fluid flow to the outlet tip of the lance along a supply passage and back from the tip along a return passage, although Bertram et al use a variant in which such flow is limited to a nozzle portion of the lance. While Belkin provides cooling water, this passes through outlets along the length of an inner pipe to mix with oxygen supplied along an annular passage between the inner pipe and outer pipe, so as to be injected as steam with the oxygen. Heating and evaporation of the water provides cooling of the lance of Belkin, while steam generated and injected is said to return heat to the bath.

U.S. Pat. No. 3,521,872 to Themelis, U.S. Pat. No. 4,023,676 to Bennett et al. and U.S. Pat. No. 4,326,701 to Hayden, Jr. et al. purport to disclose lances for submerged injection. The proposal of Themelis is similar to that of U.S. Pat. No. 3,269,829 to Belkin. Each uses a lance cooled by adding water to the gas flow and relying on evaporation into the injected stream, an arrangement that is not the same as cooling the lance with water through heat transfer in a closed system. However, the arrangement of Themelis does not have an inner pipe and the gas and water are supplied along a single pipe in which the water is vaporised. The proposal of Bennett et al, while referred to as a lance, is more akin to a tuyere in that it injects, below the surface of molten ferrous metal, through the peripheral wall of a furnace in which the molten metal is contained. In the proposal of Bennett et al, concentric pipes for injection extend within a ceramic sleeve while cooling water is circulated through pipes encased in the ceramic. In the case of Hayden, Jr. et al, provision for a cooling fluid is made only in an upper extent of the lance, while the lower extent to the submergible outlet end comprises a single pipe encased in refractory cement.

Limitations of the prior art proposals are highlighted by Themelis. The discussion is in relation to the refining of copper by oxygen injection. While copper has a melting point of about 1085° C., it is pointed out by Themelis that refining is conducted at a superheated temperature of about 1140° C. to 1195° C. At such temperatures lances of the best stainless or alloy steels have very little strength. Thus, even top blowing lances typically utilise circulated fluid cooling or, in the case of the submerged lances of Bennett and Hayden, Jr, et al, a refractory or ceramic coating. The advance of U.S. Pat. No. 3,269,829 to Belkin, and the improvement over Belkin provided by Themelis, is to utilise the powerful cooling able to be achieved by evaporation of water mixed within the injected gas. In each case, evaporation is to be achieved within, and to cool, the lance. The improvement of Themelis over Belkin is in atomisation of the coolant water prior to its supply to the lance, avoiding the risks of structural failure of the lance and of an explosion caused by injection of liquid water within the molten metal.

U.S. Pat. No. 6,565,800 to Dunne discloses a solids injection lance for injecting solid particulate material into molten material, using an un-reactive carrier. That is, the lance is simply for use in conveying the particulate material into the melt, rather than as a device enabling mixing of materials and combustion. The lance has a central core tube through which the particulate material is blown and, in direct thermal contact with the outer surface of the core tube, a double-walled jacket through which coolant such as water can be circulated. The jacket extends along a part of the length of the core tube to leave a projecting length of the core tube at the outlet end of the lance. The lance has a length of at least 1.5 meters and from the realistic drawings, it is apparent that the outside diameter of the jacket is of the order of about 12 cm, with the internal diameter of the core tube of the order of about 4 cm. The jacket comprises successive lengths welded together, with the main lengths of steel and the end section nearer to the outlet end of the lance being of copper or a copper alloy. The projecting outlet end of the inner pipe is of stainless steel that, to facilitate replacement, is connected to the main length of the inner pipe by a screw thread engagement.

The lance of U.S. Pat. No. 6,565,800 to Dunne is said to be suitable for use in the Hlsmelt process for production of molten ferrous metal, with the lance enabling the injection of iron oxide feed material and carbonaceous reductant. In this context, the lance is exposed to hostile conditions, including operating temperatures of the order of 1400° C. However, as indicated above with reference to Themelis, copper has a melting point of about 1085° C. and even at temperatures of about 1140° C. to 1195° C., stainless steels have very little strength. Perhaps the proposal of Dunne is suitable for use in the context of the HIsmelt process, given the high ratio of about 8:1 in cooling jacket cross-section to the cross-section of the core tube, and the small overall cross-sections involved. The lance of Dunne is not a top submerged injecting lance, nor is it suitable for use in top submerged lancing technology.

Examples of lances for use in pyro-metallurgical processes based on top submerged lancing technology are provided by U.S. Pat. Nos. 4,251,271 and 5,251,879, both to Floyd and U.S. Pat. No. 5,308,043 to Floyd et al. As detailed above, slag initially is splashed by using the lance prior to initiating a pyro-metallurgical operation, for a period of top blowing onto a molten slag layer. The top blowing causes slashing of the slag to form a coating of slag on the lower extent of the lance with the slag coating being to solidified, by high velocity top blown gas that generates the splashing, to achieve a protective coating of solid slag on the lance. The solid slag coating is maintained during top submerged injection within the slag, despite the lance then being lowered to submerge the lower outlet end in the slag layer to enable the required top submerged lancing injection within the slag. The lances of U.S. Pat. Nos. 4,251,271 and 5,251,879, both to Floyd, operate in this way with the cooling to maintain the solid slag layer being solely by injected gas in the case of U.S. Pat. No. 4,251,271 and by that gas plus gas blown through a shroud pipe in the case of U.S. Pat. No. 5,251,879. However, with U.S. Pat. No. 5,308,043 to Floyd et al. cooling, additional to that provided by injected gas and gas blown through a shroud pipe, is provided by cooling fluid circulated through annular passages defined by the outer three pipes of the lance. This is made possible by provision of an annular tip of solid alloy steel that, at the outlet end of the lance, joins the outermost and innermost of those three pipes around the circumference of the lance. The annular tip is cooled by injected gas and also by coolant fluid that flows across an upper end face of the tip. The solid form of the annular tip, and its manufacture from a steel alloy, results in the tip having a good level of resistance to wear and burn back. The arrangement is such that a practical operating life can be achieved with the lance before it is necessary to replace the tip in order to safeguard against a risk of failure of the lance enabling cooling fluid to discharge within the molten bath.

Further examples of lances for use in top submerged lancing technology are provided in our co-pending applications WO2013/000,017, WO2013/029,092 and PCT/IB2012/056,714. The invention of WO2013/000,017 relates to a top submerged injecting lance having at least inner and outer substantially concentric pipes, with the relative positions of the outer pipe and a next innermost pipe being longitudinally adjustable to enable a mixing chamber at their lower outlet ends to be maintained at a desired setting during a period of use to compensate for wear and burn back of the lower end of the outer pipe. The invention of WO2013/029,092 relates to a top submerged injecting lance having at least inner and outer pipes, a shroud around and spaced from the outer pipe, with the shroud longitudinally adjustable relative to the outer pipe of the lance to enable maintenance of, or variation in, a longitudinal spacing between the outlet ends of the shroud and the outer pipe. The application PCT/IB2012/056,714 provides a top submerged injecting lance having provision for circulation of a coolant fluid, in which a constriction within the lower end of the lance causes an increase in fluid flow velocity between an end wall for a return flow of coolant fluid along an outermost pipe of the lance.

The pyro-metallurgical operations conducted with both top blowing and top submerged lancing injection generate very high bath temperatures, ranging up to about 1650° C. in extreme cases enabled by top submerged lancing technology. However, accurate determination of temperature in molten bath smelting processes is critical for control of the process and optimum operation. In some cases, it is necessary that the bath temperature be maintained within a relatively narrow range, while other operations need to be able to change from one bath temperature level to another, on changing between process stages. In any case operation at the lowest practicable temperature provides the most efficient operation in terms of cost and environmental footprint.

Traditionally bath temperatures have been measured or at least inferred by methods that involve use of:
 (i) thermocouples that are mounted in a side wall of a reactor, and either embedded in, or protruding through, a refractory lining of a reactor vessel;
 (ii) thermocouples that are placed in discharge launders or weirs;
 (iii) an examination of the thickness of bath coatings frozen onto cold dip rods; and/or
 (iv) port or roof mounted pyrometers.

However, other, newer methods proposed include heat pipes, optical fibres and infrared techniques.

The traditional methods have suffered from issues of high fixed and operating costs, reliability, inaccuracy and interference such as from opaque off-gases and fumes, although pyrometry via roof or port mounted pyrometers has proven to be useful in only some circumstances. Newer methods have yet to be proven reliable or commercially viable.

Optical thermometry based on infrared techniques have been utilised in a number of ways. A paper entitled "The Benefits of Fixed Thermal Imaging" by Kresch, published in 2010 in Process Heating Magazine, points out that the amount of radiated energy from an object is a function of the objects temperature and emissivity. Kresch indicates that a thermal imaging camera can identify hot or cold spots by measuring surface temperature variations, to enable adjustment of process parameters for greater productivity and throughput. In contrast, IR spot sensors are said to be capable of only a single-point temperature reading. Kresch envisages application of thermal cameras installed at appropriate points in an incinerator, to enable prevention of major fires caused by undetected burning garbage. Numerous other parties either have proposed or used thermal cameras to monitor a stream of steel as it is poured, to enable pouring to be terminated as soon as slag is detected in the stream.

A paper entitled "Incredible Infrared" by Canfield et al., published in Process Heating Magazine in January 2009, relates to the use of IR sensors that also measure emitted IR energy from a body, as a function of the temperature and emissivity of the body. However, in contrast to conversion of detected radiated energy to an image able to be presented on a screen, using a thermal camera, the IR sensors focus the emitted energy onto a detector that generates an electrical signal able to be amplified and displayed as a temperature reading. As with the thermal cameras, the sensors can be used with both fixed and moving objects or bodies. Canfield et al. refers to measuring the temperature of a coating applied to and being cured on continuous foil. It is said that the IR sensors can receive energy emitted from a large area or a small spot on an object. A similar article by Starrh, entitled "Spectral Manoeuvres" and published June/July 2007 in Industrial Automation Asia, pp. 53-54, in describing IR sensors or thermometers, discusses the importance of target size relative to the sensors field-of-view or spot size. The sensors are said to have a sensor to target distance to spot diameter able to vary from 2:1 models to a more expensive 300:1 model. The Starrh article also is illustrated by reference to a coating applied to and being cured on strip, in that instance in forming a laminate. Also, the Raytek website at www.raytek.com details, in "Success Story 64", use of an IR sensor for measuring the temperature of a molten metal alloy under vacuum and needing to be held at a stable temperature for investment casting. Two sensors are used, to enable comparison of their outputs, and are said to reduce the number of dip probes an operator needs to use in order to check temperature from time to time.

These applications of IR thermal imaging cameras and IR sensors or thermometers have not been found to be suitable for use in measuring the temperature of a molten bath in a pyro-metallurgical process conducted by top submerged lancing technology. This is despite the fact that the papers by Kresch, Canfield et al. and Starrh, and Success Story 64, relate to temperature measurements varying from about 685° F. (about 365° C.) in Canfield et alto about 2730° F. (about 1500° C.) in Success Story 64. At least at the upper end, this range is applicable to pyro-metallurgical operations.

A Steel Project Fact Sheet, published by the Office of Industrial Technologies, Energy Efficiency and Renewable Energy, US Department of Energy, and published in February 2001, proposes optical sensors and controls for improved basic oxygen furnace (BOF) operations. The proposal is to mount an optical sensor at the tip of a lance by which oxygen is blown at supersonic velocity downwardly, from above a molten bath of pig iron and slag. The sensor mounted on the lance enables determination of a bulk temperature for the bath from the slag temperature, using optical image-based techniques, while oxygen is not being blown. Also, the sensor enables monitoring, during oxygen blowing, of hot spot emission from the iron where the supersonic oxygen displaces slag to expose a surface region of the iron. The arrangement additionally is said to provide for bath height measurement for improved lance operating practice during a blow, as well as to enable viewing of the furnace interior for assessment of wear and slag splashing.

Others have proposed the use of infrared optical sensors for temperature measurements in submerged arc smelting furnaces, such as for the production of titaniferous slags, as well as ferro-silicon and ferro-chromium alloys. However, this use principally has focussed on determining temperature profiles for electrodes formed in the furnace during smelting. See, for example, the papers by Farina et al entitled "Measurement of temperature profiles in electrodes for silicon metal production", IAS'2004, Seattle, 2004, pp. 195-199, and Laohasongkram et al., entitled "Application of Thermal Detector by Infrared for Electrical Arch Furnaces Transformer", ICCAS, Oct. 17-20, 2007, in Seoul, Korea.

The present invention relates to an improved temperature measuring apparatus for use in measuring the temperature of a molten bath of a top submerged lancing installation, in the course of conducting a pyro-metallurgical operation in the top submerged lancing installation.

BRIEF SUMMARY OF THE INVENTION

According to the present invention, there is provided a temperature measuring apparatus for a top submerged lancing installation, for use in measuring the temperature of a molten bath that includes a slag phase, during a pyro-metallurgical operation conducted in a reactor of the installation. The apparatus includes a top submerged injecting lance having at least an outer pipe and an inner pipe, with a bore defined by the inner pipe and an annular passage defined in part by an inner surface of the outer pipe. The apparatus further includes a pyrometer device of which at least a receiver unit is mounted in relation to the top submerged injecting lance, with the receiver unit operable to receive infrared energy passing longitudinally within the lance from an outlet end of the lance, and with the pyrometer device operable to generate from received infrared energy an output signal or display indicative of the temperature of a molten bath in which an outlet end portion of the lance is submerged and from which the infrared energy is received.

The top submerged injecting lance of the apparatus may be one that, in use, is cooled and thereby maintains a protective slag coating solely as a consequence of gas or gases being injected through the lance. Alternatively, the lance may additionally be cooled by circulation of coolant fluid, such as from the inlet end to the outlet end and then back to the inlet end. For cooling by means of circulated coolant fluid, the lance may have a double walled outer pipe, with a sleeve provided between inner and outer walls of the outer pipe to separate incoming and outgoing coolant streams.

In use of the temperature measuring apparatus, the outlet end portion of the top submerged injecting lance is of a length such that, when submerged in the slag phase of a molten bath, submerged injection of an oxygen-containing gas is at a required depth within the slag, and combustion of the fuel generates a flame providing a combustion region within the slag phase. Additionally, the submerged injection generates strong turbulence within the slag, and splashing from the top surface of the slag. Prior to being submerged, the top submerged injecting lance is suspended a short distance above the slag surface, and a mixture of fuel and oxygen issuing from the outlet of the lance is fired to generate a strong flame jet that impinges on the slag surface to cause splashing of the slag and coating of a lower extent of the lance. The coating is solidified by the cooling effect of gas passing through the top submerged injecting lance, and the solidified slag coating is able to be retained and protects the lance after the outlet end portion is submerged in molten slag. The strong flame prevents the slag or other material of the bath from rising up within the submerged outlet end portion of the top submerged injecting lance and maintains across and adjacent to the outlet end of the lance a submerged surface area within the bath. That submerged surface area within the bath, herein designated as an infrared emitting surface, provides a surface from which infrared energy is emitted and passes longitudinally within the lance. At least a part of the infrared emitting surface falls within the field of view of the receiver unit of the pyrometer device and it is the infrared energy emitted within the field of view that enables a determination of the temperature of the bath at the infrared emitting surface. The infrared emitting surface usually is a slag surface but, despite the submerged injection being within the slag phase, the flame may extend into a phase that is below the slag such that it is the phase below the slag that defines the infrared emitting surface, as will be evident from the reference below to U.S. Pat. No. 5,888,270 to Edwards et al.

In the apparatus, at least the receiver unit of the pyrometer device is mounted in relation to the top submerged injecting lance within the periphery of at least the outer pipe of the lance, such as within an annular passage between the inner and outer pipes for a lance having only two pipes. Where the top submerged injecting lance includes at least one intermediate pipe between the outer and inner pipes, at least the receiver unit of the pyrometer device may be within the periphery of the outer pipe and between the outer pipe and a next inner-most pipe; or between two intermediate pipes; or between the inner pipe a the next outer-most pipe. At least the receiver unit of the pyrometer device even may be within the periphery of the inner pipe, subject to the fuel/reductant being of a suitable type, such as a hydrocarbon gas, that does not obstruct operation of the device. However, regardless of the number of pipes comprising the top submerged injecting lance, at least the receiver unit of the pyrometer device preferably is within the periphery of the inner pipe. The receiver unit may be adjacent to an inlet end of the top submerged injecting lance, although the receiver unit preferably is spaced from each of the inlet and outlet ends of the lance. The receiver unit of the pyrometer device may be nearer to the outlet end than to the inlet end of the lance. Most preferably the receiver unit is spaced from the outlet end of the top submerged injecting lance by a minor part of the length of the lance. In each case, the receiver unit can be positioned within the top submerged injecting lance as determined by the cone angle within which the receiver unit is able to receive infrared energy passing from the outlet end of the lance, and by the requirement that the receiver unit receives infrared energy from a spot or region of the infrared emitting surface that is of a diameter allowing reliable temperature determination. The position of the receiver unit of the pyrometer device preferably results in the field of view for the receiver unit being of a sufficient diameter, with the field of view substantially filled by the area of the spot or region. The field of view may be substantially filled by the infrared emitting surface, such that the spot or region substantially corresponds to the infrared emitting surface.

Throughout this specification, the designation of the ends of the top submerged injecting lance as an inlet end and an outlet end is relative to the direction along the lance in which fuel/reductant and oxygen-containing gas pass in being injected into the slag phase of the molten bath, in conducting a pyro-metallurgical operating. In use in a top submerged lancing pyro-metallurgical operation, the inlet and outlet ends therefore correspond to upper and lower ends, respectively, of the top submerged injecting lance. Also, on the issue of terminology, the reference to fuel/reductant denotes at least one material suitable for use as fuel to be combusted, to produce a combustion flame by ignition of a mixture of fuel/reductant and oxygen-containing gas formed at the outlet end of the lance by the injection within the slag, and for use as a reductant able to be dispersed within the slag, beyond the outlet end of the lance. The proportions of the material that functions as fuel and as reductant can be adjusted, as appropriate to generate oxidising or reducing conditions appropriate to optimise a given pyro-metallurgical operation, by adjusting the ratio of oxygen to fuel/reductant injected by the lance and thereby determining the extent of combustion of the material as fuel.

The receiver unit of the pyrometer device preferably is oriented so that it has a cone axis substantially parallel with a longitudinal axis of the top submerged injecting lance. This orientation enables infrared energy being received from a spot or region of substantially fully circular form, although it is acceptable for the spot or region to be of elliptical form. When the receiver unit is positioned in an annular passage between two of the pipes of the top submerged injecting lance, the spot or region generally will have a smaller diameter than is possible for the receiver unit if positioned within the inner pipe. That is, the field of view is smaller when the receiver unit is in an annular passage between pipes, necessitating use of a receiving unit with a relatively small cone angle and/or positioning of the receiver unit at a lesser distance from the outlet end of the lance. In each case, the spot or region is on the infrared emitting surface that is defined by and within the bath, below the top surface of the slag phase, and that is adjacent to and extends across the outlet end of the top submerged injecting lance but is displaced slightly from the outlet end by the combustion flame resulting from combustion of the fuel component of the fuel/reductant. In almost all top submerged lancing pyro-metallurgical operations, the surface will be a slag surface. However, where the submerged injection results in the flame penetrating a matte or metal phase below the slag, such as in the U.S. Pat. No. 5,888,270 to Edwards et al. in which blister copper collects below the slag phase, the surface is defined below the slag by the matte or metal phase. Edwards et al. reasonably can be understood as suggesting that even the outlet end of a top submerged injecting lance can be within the copper phase and, while this is possible with the top submerged injecting lance of the apparatus of the present invention, it is undesirable as it generally is not necessary and also results in a significantly reduced operating life for the lance before it needs to be replaced and, if practical, repaired.

With the temperature measuring apparatus of the invention, the receiver unit of the pyrometer device is operable to receive infrared energy emitted from the spot or region of the surface defined by the molten bath and converging towards the receiver unit within the cone angle at which the receiver unit is set. The pyrometer device may include a lens unit that receives and focuses the infrared energy, and a detector unit onto which the focused energy is passed by the lens unit. The detector unit generates an electrical signal indicative of the bath temperature at the spot or region of the surface of the bath. The detector unit signal may be passed to an amplifier unit of the pyrometer device and an amplified signal generated by the amplifier unit is passed to a display unit located externally of the top submerged injecting lance and operable to display the measured bath temperature at the spot or region. The detector unit usually requires data on the emissivity of the bath at the spot or region, and this may be measured by the pyrometer device, or provided as input data to the device from published emissivity data for the material of the bath generating the emitted infrared energy being processed by the pyrometer device. It is usual with an pyrometer device operating on single-wavelength thermometry for emissivity to be provided as input data supplied to the device. However, with a device operating on dual- or multi-wavelength thermometry, a temperature determination can be based on the ratio of the spectral energy at two different wavelengths of the received infrared energy, if the emissivity is substantially the same at each of the wavelengths.

The receiver unit may include a lens unit, detector unit and amplifier of the pyrometer device contained in a common housing by which the device is mounted in relation to the top submerged injecting lance. However, this can, and generally will, necessitate the supply of coolant fluid to the device in order to maintain the device at an ambient temperature that obviates overheating of the components of the device. However, a generally desirable alternative is to have the detector unit and the amplifier housed externally of the top submerged injecting lance, with a separate receiver unit housing, containing the receiver unit and preferably the lens unit, with the receiver unit housing mounted in relation to the top submerged injecting lance. In the latter case, the receiver unit and its housing comprise a remote head assembly, with this in communication connection with the detector and amplifier units by a line or cable, such as a fibre optic cable, that passes from the receiver unit, upwardly in the lance to pass through the outlet end of the lance to the detector unit. The communication connection between the two may be suitably protected and capable of working at elevated temperatures. Alternatively, where the receiver unit, detector unit and possibly also the amplifier are in a common housing, an electrical line or cable may extend upwardly in the lance to an external display device.

As indicated in "The Estimation of Slag Properties", published by Mills of Imperial College, London, as a course presented on Mar. 7, 2011 on South African Pyro-metallurgy, the emissivity value predominantly depends on the surface and not the bulk, as does surface tension. In a slag other than of a relatively simple, well known structure, it can be preferable for the pyrometer device to be operable to generate a determination of emissivity of the bath at the spot or region from which the pyrometer device receives the infrared energy. Mills further points out that slags are semi-transparent to infrared radiation, resulting in emissivity varying with slag depth. A slag is regarded as in an optically thick condition if the product of the absorption coefficient of the slag and the slag depth in meters is greater than 3 (i.e. if $\alpha*d>3$, where "$\alpha*$" is the absorption coefficient and "d" is depth in meters). However, the slag depth in top submerged lancing operations generally will be sufficient to satisfy this relationship and enable reliance on published emissivity values, where available. This is because the top submerged injection is within an upper region of the slag phase in many instances, enabling there to be a substantial depth of slag below the out end of the top submerged injecting lance and, more particularly, below the infrared emitting surface. Also, the temperature measurement enabled by the apparatus of the invention, while taken at a plane within the slag phase, is a measure of the temperature essentially of the slag phase as a whole. This because the surface at that plane of which the temperature is measured, that is, the infrared emitting surface at which the field of view of the pyrometer device is located, is a surface maintained at a depth within the turbulent slag phase as a whole. This is quite different to measurement of the temperature of a top surface region of a slag phase, even if the slag phase is not subject to the turbulence generated by the top submerged injection, as the temperature at such top surface can differ significantly from the slag temperature within the slag. The surface temperature at the top of the slag can be significantly higher or lower the temperature within the slag, depending on whether or not post-combustion of process off-gases is conducted above the slag.

In the apparatus of the invention, a head assembly of the receiver unit, or the receiver unit and a lens, or the complete pyrometer device, is able to be mounted in relation to the top submerged injecting lance in a number of different ways. The head assembly may be secured to at least one of the pipes by a mounting, such as a frame or bracket, fixed to the at least one pipe, with the mounting not preventing the flow through the top submerged injecting lance of fuel/reductant, oxygen-containing gas or raw material required to be ingested into the slag layer to achieve required smelting or smelting conditions. Alternatively, the head assembly or the pyrometer device may be mounted in relation to the top submerged injecting lance by being attached to an elongate rod or conduit extend longitudinally within the lance, downwardly from the inlet end of the lance, with a bracket preferably being provided between the pyrometer device and the surface of an adjacent pipe of the lance in order to brace the pyrometer device and retain it in a required position in the lance. The use of a conduit system, having coolant fluid supply and return lines, may be used if the pyrometer device requires a coolant fluid to be circulated through a casing for the pyrometer device in order to maintain the device at an ambient temperature appropriate for preventing heat damage to its operating components. However, coolant is not required for components of the pyrometer device operable at sufficiently high ambient temperatures. The use of a rod or conduit for suspending the pyrometer device within the top submerged injecting lance has the benefit of enabling the device to be removed from the lance, such as for service or replacement. Additionally, the rod or conduit enables the pyrometer device to be adjusted longitudinally within the top submerged injecting lance, such as required in the event that the lance needs to be raised or lowered as a whole, or the relatively longitudinal position of at least one pipe of the lance with respect to at least one other pipe needs to be adjusted, in the course of a pyro-metallurgical operation or to allow for wear and burn-back of the outer pipe at the outlet end of the lance.

The amplifier unit of the pyrometer device may be incorporated within a common housing also containing the receiver unit lens or the detector unit. Alternatively, the amplifier unit may be separately housed, such as exteriorly of the top submerged injecting lance. The output from the detector is non-linear and may be only about 100 to 1000 μV. If the output signal from the detector unit is to be passed to an amplifier unit that is external of the lance, it is preferred that the output signal be converted to a form enabling its transmission to the external amplifier unit via a fibre optics cable, in order to minimise degradation of the output signal. Alternatively, with only the receiver unit mounted in relation to the top submerged injecting lance, the received infrared energy is able to be communicated to the detector by a fibre optic cable essentially without risk of degradation.

Several commercially available pyrometer devices are able to be used in the temperature measuring apparatus of the invention. A main requirement for the pyrometer device is an ability to operate reliably in measuring temperatures in excess of 1000° C., ranging to over 2000° C. Also, while the pyrometer device is able to be cooled, it is desirable that it be able to operate reliably at ambient temperatures of up to about 450° C. to which it can be exposed, even if only in the event of failure of a system providing a flow of coolant fluid to the device. The pyrometer device can be one operating on single-, dual- or multiple-wavelength thermometry, with cost and the availability of emissivity data for the slag phase for a given molten bath being the main determinant for a choice between these alternatives. Examples of suitable pyrometer devices for use in the temperature measuring apparatus of the invention include the M668 pyrometer model available from Mikron Infrared Inc., the NEWPORT iR2 pyrometer of Newport Electronics, Inc. and the PYRO-SPOT DSRF 11N pyrometer of Dias Infrared GmbH.

The top submerged injecting lance can be of any of the known forms. Thus, the top submerged injecting lance may be in accordance with any of the forms disclosed in any of the U.S. Pat. Nos. 4,251,271 and 5,251,879 both to Floyd, U.S. Pat. No. 5,308,043 to Floyd et al., or in any of our co-pending patent applications WO2013/000,017, WO2013/029,092 and PCT/IB2012/0,567,714.

That good measurement of the temperature of the slag phase of a molten bath is possible with the temperature measuring apparatus of the present invention, in the course of a pyro-metallurgical process conducted with the lance of the apparatus, is very surprising. Attempts at measuring the temperature of a flame jet generated with a top submerged injecting lance after a mixture of fuel and oxygen had been fired, without the outlet end portion of the lance submerged in a molten bath, proved to be unsuccessful. Infrared energy generated by the flame was received longitudinally into the lance from the outlet end, and it appeared that a pyrometer would only measure flame temperature and not provide useful information on the molten bath temperature. That is, the indications were that results with the outlet end portion of the lance submerged in the slag phase of a molten bath also would not provide a useful measure of the temperature of the slag phase, particularly given the high degree of turbulence within the slag that resulted from the submerged injection. Also, in a top submerged lancing operation, the slag is the reaction medium in which raw materials are dispersed and circulated and in which they are subjected to reducing or oxidising reactions enabled by the chosen conditions of top submerged injection. The composition of the slag phase with dispersed raw material and reaction products is quite different to that of the slag alone. The situation therefore is quite different to that obtaining in the use of infrared thermometry with a solid, even if moving, or with a flowing steam of a liquid such as molten steel, or in the temperature measurement in a basic oxygen furnace for refining pig iron. In the latter case, the top blown oxygen causes the slag to be displaced to expose the molten iron for temperature measurement. There also is no combustion of fuel at the outlet tip of such top-blowing lance. The iron presents a surface of relatively constant composition, while it is the temperature of the iron that is required, not that of the slag. Also, as in top submerged lancing operations, the BOF slag is in a turbulent state and does not provide a stable surface form amenable to temperature measurement. The surface of the slag in a top submerged lancing operation is constantly broken up, with large quantities of slag being ejected into the reactor space above the bath and then falling back. Such ejected slag either cools below the temperature of the layer of slag or, more usually, with post-combustion of evolved off-gases, such as carbon monoxide and hydrogen, the ejected slag is heated above the temperature of the layer of slag for the purpose of recovering heat energy to the bath. Each of these factors suggest that the bath temperature would not be able to be reliably measured by use of the apparatus of the invention.

Despite experience with other uses of infrared thermometry, and with initial trials with fired top submerged injecting lances conducted without submergence of the outlet end portion of the lance of the apparatus of the invention, it surprisingly has been found that excellent temperature measurement is possible with the outlet end portion of a top submerged injecting lance of the apparatus of the invention submerged, as required for conducting a pyro-metallurgical operation. In particular, the apparatus of the invention enables excellent measurement of the temperature of the slag phase of a molten bath in a top submerged lancing operation and, as the slag phase is the reaction medium for reactions for a given top submerged lancing operation, this measure is of critical importance. In other processes, such as submerged arc smelting, the temperature of the metal phase below the slag or reaction mixture is the required measure, but the metal phase is not directly accessible and a compromise measurement is made of the generally cooler slag or reaction mixture.

The temperature measuring apparatus of the invention may include one pyrometer devices. In that case each of the devices may have at least a receiver unit mounted in relation to the top submerged injecting lance and operable to receive infrared energy passing longitudinally within the lance from said outlet end, with each operable to focus the infrared energy it so receives and enable generation of a respective output signal. Each of the pyrometer devices may be mounted within the bore defined by the inner pipe. Alternatively or additionally, the pyrometer devices may include at least one pyrometer device mounted within an annular passage defined between at least one of the inner and outer pipes and an intermediate pipe between the inner and outer pipes.

BRIEF DESCRIPTION OF THE SEVERAL VIEWS OF THE DRAWINGS

In order that the invention may be understood more fully, reference now is made to the accompanying drawings, in which.

DETAILED DESCRIPTION OF THE INVENTION

Figure 1:
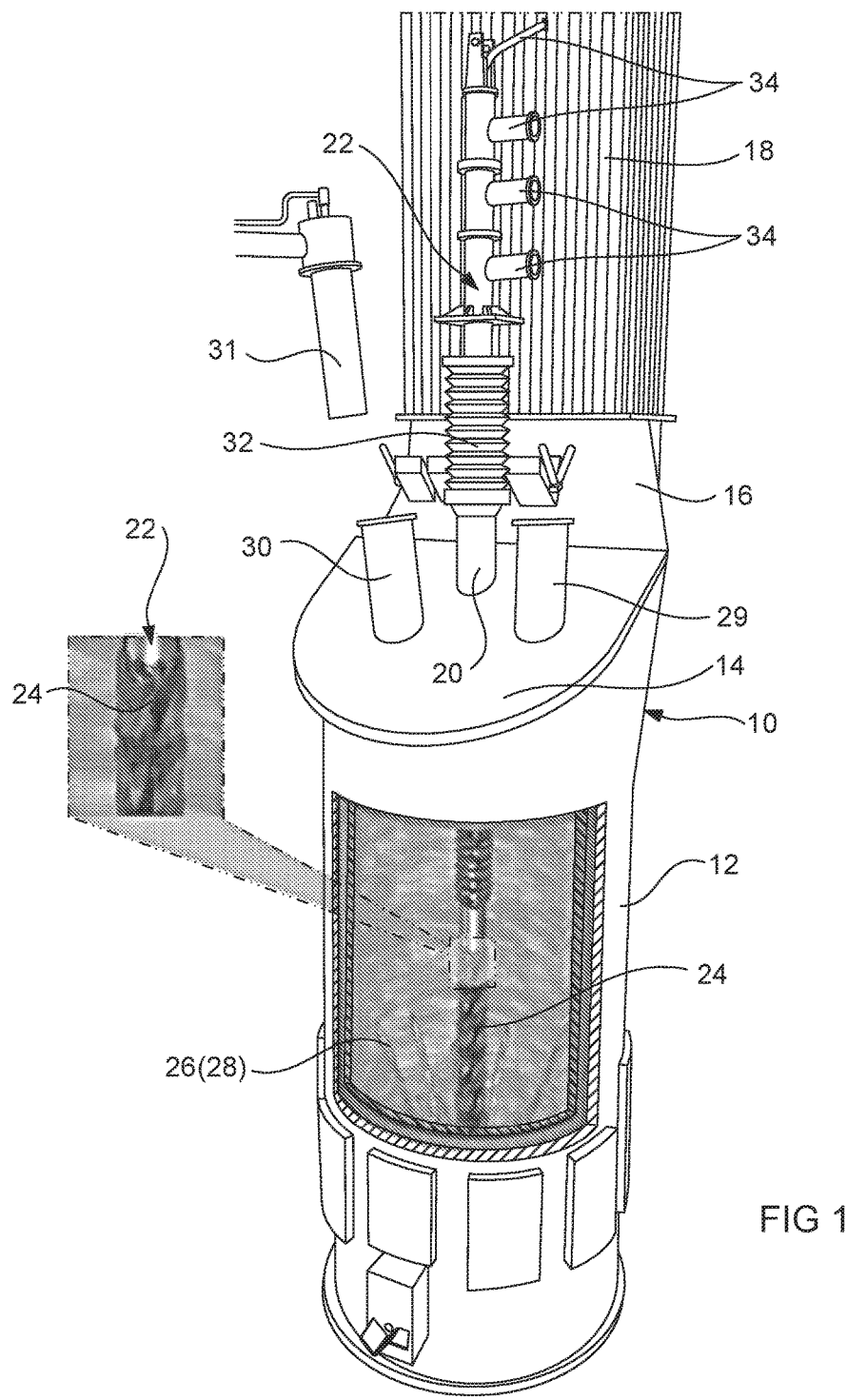
FIG. 1 is a partially cut away perspective illustration of a top submerged lancing reactor.

A reactor 10 shown in FIG. 1 is but one example of a possible top submerged lancing reactor and lance arrangement. The reactor 10 has a cylindrical shell 12 closed at its top end by an inclined roof 14 from which an off-take flue 16 projects upwardly to an off-gas boiler/heat exchanger 18. In the illustration of FIG. 1, a rectangular part of the shell 12 has been removed to enable the interior to be viewed, although the shell 12 is circumferentially continuous at all levels in its height, apart from tap holes. The roof 14 has an inlet 20 down through which a top submerged injecting lance 22 extends so that, after a protective slag coating 24 has been formed and solidified on a lower section of the lance 22, a lower end portion of the lance 22 is submerged in an upper slag phase 28 of a molten bath 26. The reactor 10 also has a feed port 29 opening through roof 14 to enable raw materials for a required pyro-metallurgical operation to be charged into the slag 28 of bath 26, and a burner port 30 for enabling insertion of a burner 31 if required for heating the reactor. Lance 22 has connectors 34 that enable connection of lance 22 to separate sources of fuel/reductant and oxygen-containing gas, to enable the separate passage of these materials down through lance 22 and to mix at the lower, outlet end of lance 22 to feed a combusting mixture.

The combustion of the fuel and oxygen mixture generates a combustion zone in slag 28 at the lower, outlet end of lance 22, as well as strong turbulence in the slag 28 that causes the raw materials charged through port 29 to be dispersed in slag 28 to give rise to the required pyro-metallurgical reactions within the slag 28.

Figure 2:
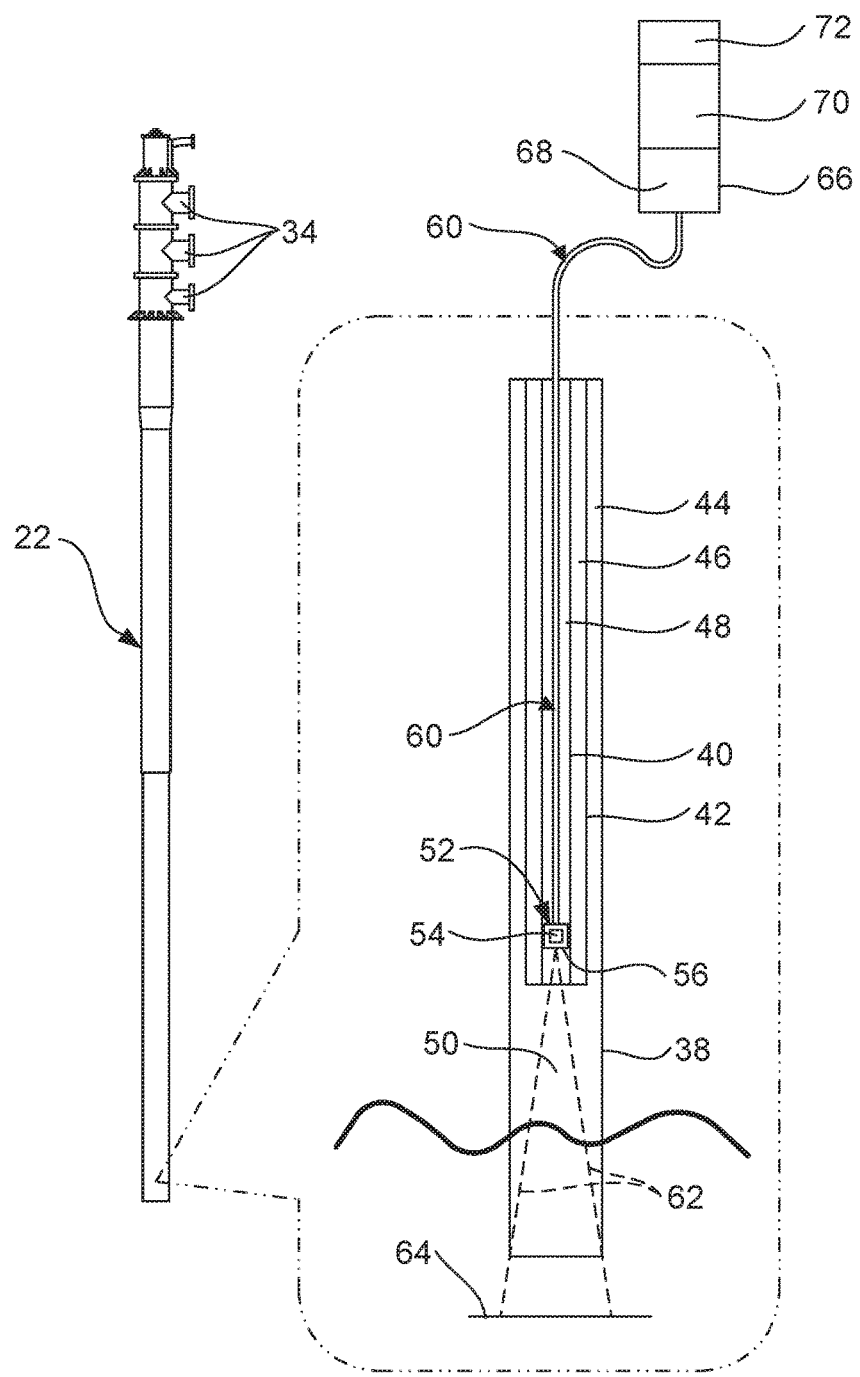
FIG. 2 shows a representation of one form of temperature measuring apparatus according to the invention, of which a lower end section is shown on an enlarged scale and section.

The lance 22, as depicted in FIG. 2, is a schematic illustration of the lower end of one form of top submerged injecting lance that has temperature-measuring apparatus. The lance 22 comprises an outer pipe 38, an inner pipe 40 and, between pipes 38 and 40, an intermediate pipe 42. The pipes 38, 40 and 42 are substantially circular in cross-section and substantially concentrically arranged. An annular passage 44 defined between pipes 38 and 42 enables the supply of air, while a passage 46 defined between pipes 40 and 42 enables the supply of oxygen. The bore 48 defined by pipe 40 enables the supply of fuel/reductant. As shown, pipes 40 and 42 terminate a short distance, relative to the overall length of lance 22, above the lower end of pipe 38 to provide a mixing chamber 50 in which the fuel/reductant, air and oxygen mix to facilitate efficient combustion of the fuel at the lower end of pipe 38. The lance 22 may have a length of up to about 25 meters and an outside diameter of up to about 0.5 meters for commercial operation. A pilot plant version of lance 22 may be only about 4 meters long and about 0.075 meters external diameter.

One form of a temperature measuring apparatus according to the invention is illustrated in FIG. 2 and includes lance 22 in combination with pyrometer device 52. The device 52, shown greatly enlarged relative to the diameter of inner pipe 40, comprises a sensor head that, in the arrangement illustrated, consists of a housing 56 containing a lens or sensor unit 54 and a fibre optic cable 60 having one end in communication with the lens unit. The sensor head 54 is mounted within the lower extent of inner pipe 40 in which it is supported by a suitable frame or bracket (not shown) providing minimal obstruction to the flow of fuel/reductant downwardly through pipe 40. The sensor head 54 is positioned so as to be able to receive and focus infrared energy received upwardly through the lower end, and longitudinally along, lance 22. The arrangement may be such that the lens unit 58 receives infrared energy within a cone depicted by lines 62, such as from a surface formed within the layer of slag 28 as a consequence of the top submerged injection by lance 22, as depicted schematically by line 64. The cone angle depicted by lines 62 is a maximum for the distance of the lens unit 58 from the outlet end of lance 22, as a larger cone angle would result in interference from the cone hitting at least one of pipes 38 and 40. A lesser cone angle may be appropriate, as the spacing of lens unit 58 from the surface at line 64 at which the received infrared energy is emitted needs to correspond substantially with the focal length of the lens of the lens unit 58. The PYROSPOT DSRF 11N available from Dias Infrared GmbH, for example has an adjustable focal length. However, the arrangement shown provides the maximum field of view on the infrared energy-emitting surface, thereby enabling a more accurate temperature determination.

In the arrangement of FIG. 2 the fibre optic cable 60 passes upwardly from the sensor head 58 within pipe 40 and out from the inlet end of lance 22, to an external housing 66 containing a detector unit 68, an amplifier unit 70 and a display device 72. The infrared energy that is received at the sensor head 54 is focused by the lens unit 58, so that focused infrared energy passes along cable 60 to housing 66. The energy is received by detector unit 68 by which it is converted to an output electrical signal that is amplified by amplifier unit 70 and passed to the display 72 at which a readout of the slag temperature is displayed.

If required, the extent of cable 60 within pipe 40 may be within a conduit through which coolant fluid is able to circulate to control the ambient temperature of the sensor head 54 and, in particular, the lens unit 58 within housing 56.

While the temperature measuring apparatus of FIGS. 1 and 2 shows only a single pyrometer device 52 in lance 22, there may be more than one device 52 in the one lance 22, such as up to 4 devices 52. The devices may all be within pipe 40, or at least one may be between pipe 40 and pipe 42, and/or between pipe 38 and pipe 42.

Figure 3:
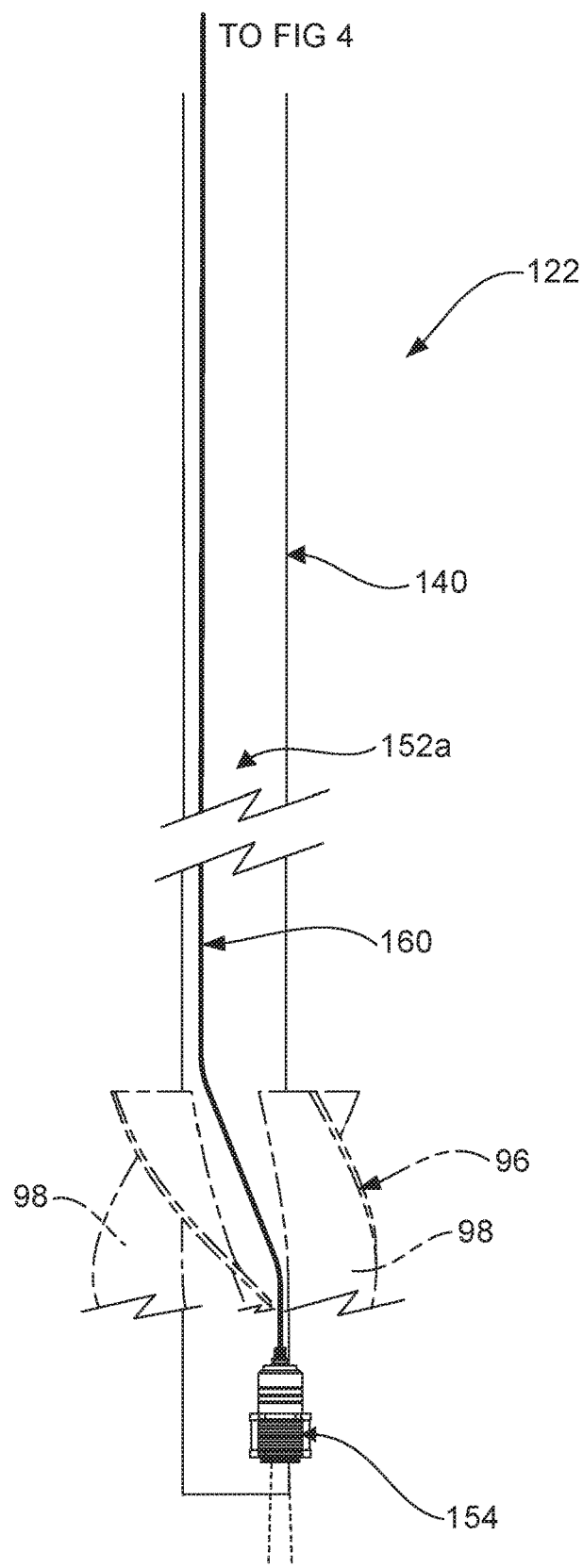
FIG. 3 is a part sectional view of components of a lower part of another form of temperature measuring apparatus according to the invention.
Figure 4:
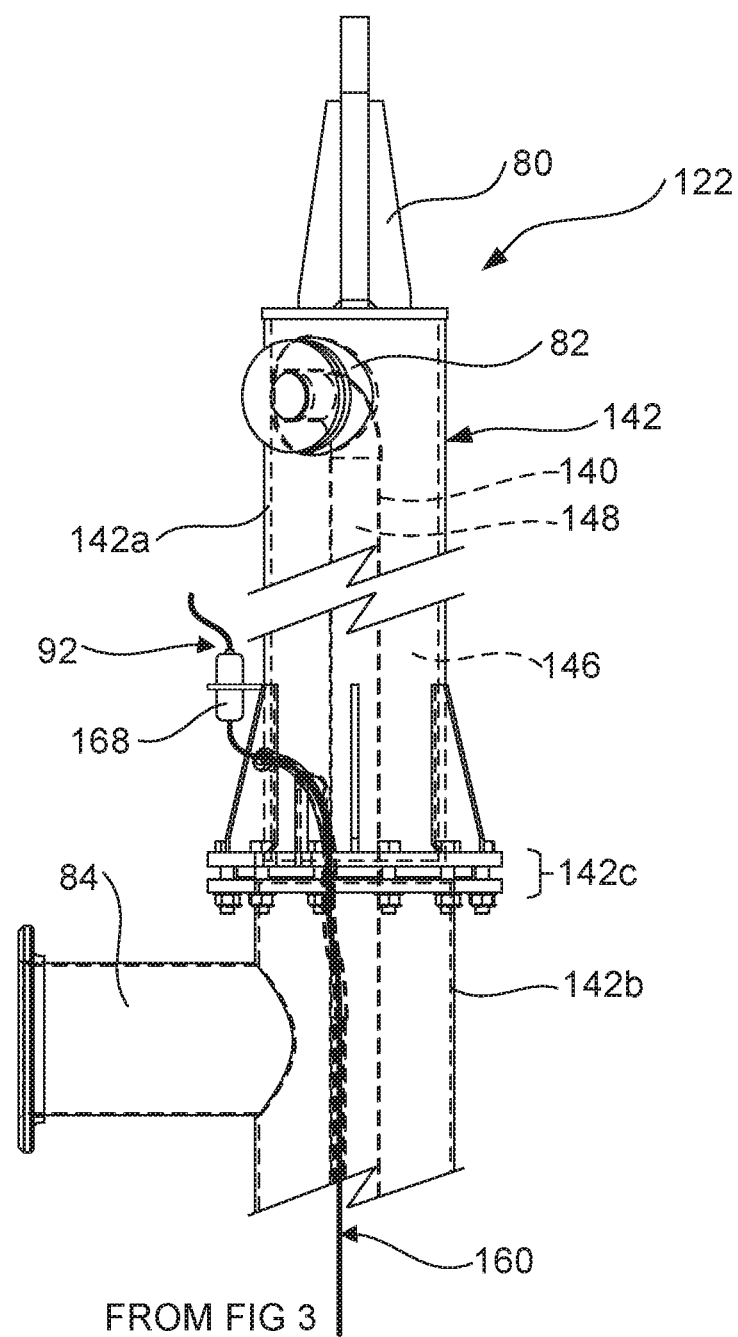
FIG. 4 shows detail in relation to the components of an upper part of the apparatus of FIG. 3.

The arrangement of FIGS. 3 and 4 largely will be understood from the description of FIGS. 1 and 2. In FIGS. 3 and 4, components corresponding to those of FIGS. 1 and 2 have the same reference numeral, plus 100. Lance 122 has an intermediate pipe 142 and, as seen in broken outline in FIG. 4, an inner pipe 140. The respective pipes 142 and 140 also are referred to as the inner air/oxygen pipe and the fuel gas pipe. However, pipe 142 may supply oxygen or oxygen-enriched air along the passage 146 defined between pipes 140 and 142, while pipe 140 may supply fine, particulate coal entrained in a carrier gas, or fuel oil or gas along the bore 148 defined by pipe 140. Also, while not shown, lance 122 has an outer pipe corresponding to pipe 38 of lance 22, with air being supplied through an annular passage, corresponding to passage 44 of lance 22, between the outer pipe and pipe 142 to enable the supply of air for cooling the outer pipe and maintaining protective a coating of solidified slag over a sufficient part of the lower extent of lance 122.

As seen in FIG. 4, the upper or inlet end of lance 122 has a coupling device 80 secured on and projecting above pipe 142 to enable lance 122 to be raise and lowered by overhead hoisting system. Also, the lance 122 has an inlet connector 82 that communicates with pipe 140 to enable the supply of natural gas (or other suitable fuel/reductant for a top submerged lancing operation) from a source of supply, for flow of the fuel/reductant down through the bore 148 of pipe 140. The connector 82 passes through the wall of a separable upper part 142*a* of pipe 142 to communicate with pipe 140. The part 142*a* of pipe 142 is coupled end-to-end with the main extent 142*b* of pipe 142 by a double-flange sealed coupling 142*c*. At a level below connector 82 and coupling 142*c*, lance 122 has a connector 84 that communicates through pipe 142 to enable the supply of oxygen-containing gas, such as oxygen-enriched air, from a source of supply, for flow down through passage 146.

While not shown, the upper end of the outer pipe terminates a short distance below connector 84. A further connector (not shown) communicates through the upper end of the outer pipe to enable the supply of air, from a source of supply, for flow down through the annular passage between the outer pipe and pipe 142. The flow of air is such that slag splashed onto the outer surface of the outer pipe is cooled to form a protective coating of solidified slag that is able to be maintained, even over the lower extent of the lance 122 when submerged in the slag phase.

The arrangement resulting from the further connector for the outer pipe and the connectors 82 and 84 is such that the gas injected down the lance 122, from both the passage 146 and the passage between the outer pipe and pipe 142, mixes at the lower end of lance 122 with fuel/reductant from bore 148. Thus, a combustible mixture can be formed at the lower end of lance 122 and, when fired, the mixture generates a combustion flame that provides combustion of the fuel component of the fuel/reductant. With that lower end submerged within a slag phase for top submerged injection, the combustion flame produces a heat-generating combustion region within the slag phase throughout a period in which submerged injection is conducted. If the oxygen content of the mixture is equal to, or exceeds, the stoichiometric requirement for combustion of all of the fuel/reductant as fuel, neutral to oxidising conditions will be generated within the slag phase, depending on the level of the oxygen excess. Alternatively, with insufficient oxygen in the mixture for combustion of all fuel/reductant, part of the fuel/reductant will not be combusted and so will be available as reductant such that reducing conditions will prevail within the slag. The pipe 140, but preferably also pipe 142, may terminate with its lower end a relatively short distance above the lower end of the outer pipe such that a mixing chamber (not shown) is formed within the lower end of the outer pipe, such as in a manner similar to chamber 50 of lance 22.

The lance 122 further includes a pyrometer device of which a lower part 152a is shown in FIG. 3, with an upper part 152b shown in FIG. 4. The lower part 152a is mounted in passage 146 against the outer surface of pipe 140, and includes sensor head 154 mounted at the lower end of an optical cable 160, in a lower region of lance 122, adjacent to a swirler 96 having a plurality of vanes 98. The cable 160 passes upwardly within the passage 146. As shown in FIG. 4, the upper end of the cable 160 forms part of the upper part 152b of the pyrometer device 152 and passes upwardly in passage 146 into the top end of lance 122 to a location at which it exits through a seal in part 142a of pipe 142. Infrared energy received by the sensor head 154 and focussed can passes along optical fibre cable 160 to detector unit 168. The infrared energy is converted by detector unit 168 to an electrical signal. Power and signal cable 92 can send the electrical signal to an electrical junction box (not shown) and a signal display device or recorder (also not shown) enabling monitoring of the temperature of the molten slag being subjected to top submerged injection for a required pyro-metallurgical operation.

As can be appreciated from FIGS. 3 and 4, the pyrometer device 152 of the lance 122 is disposed between the inner pipe 140 and the intermediate pipe 142, in the oxygen passage 146 between those pipes 140,142. This is in contrast to the arrangement of FIG. 2, in which the device 52 is within the bore 48 of the inner pipe 40. In FIG. 2, the device 52 is adjacent to the upper end of the mixing chamber 50, and lance 122 preferably has a mixing chamber, with device 152 also located adjacent to the upper end of the mixing chamber. The arrangement of FIG. 2 is suitable for a pilot plant or a small capacity top submerged lancing reactor, although the arrangement of FIGS. 3 and 4 is preferred, particularly for larger reactors.

Figure 5:
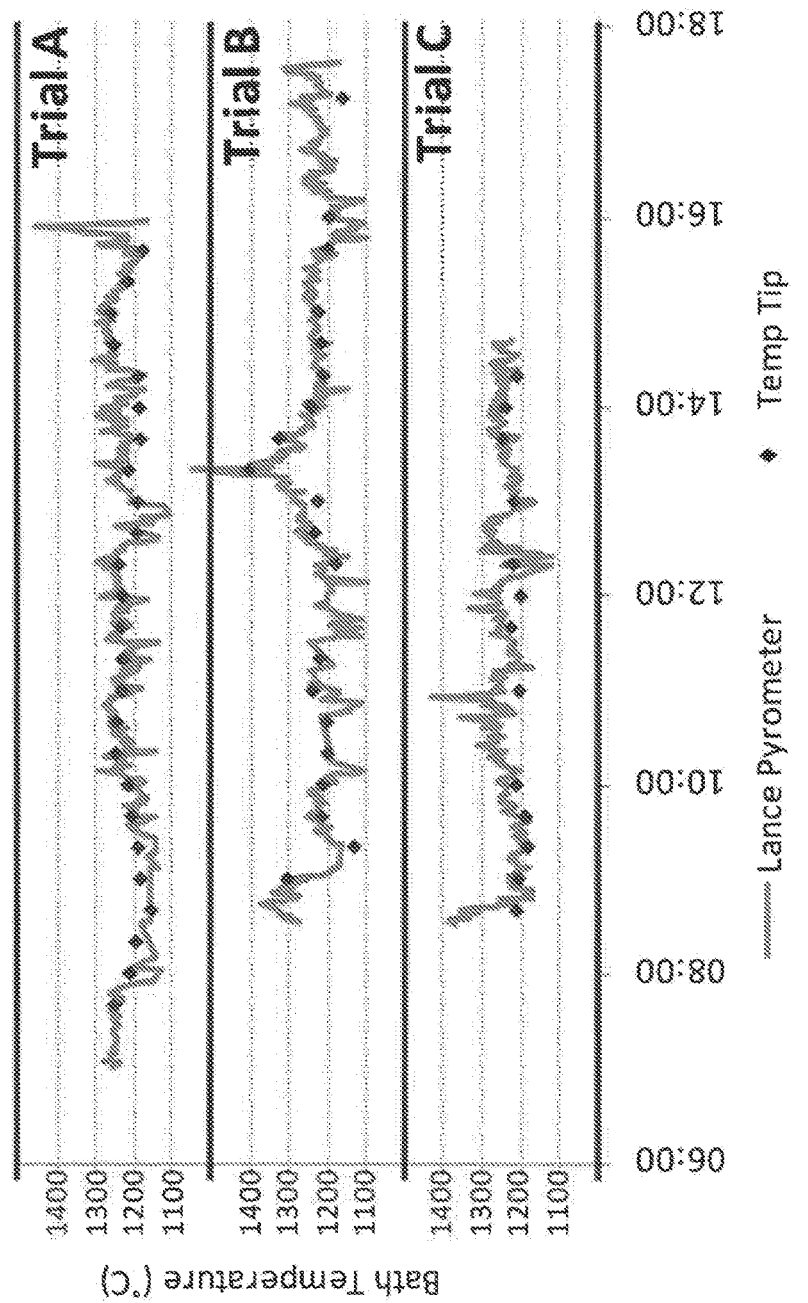
FIG. 5 shows temperature variation with time, measured during pilot plant trials conducted with temperature measuring apparatus of the invention.

FIG. 5 provides the results obtained in three pilot plant trials, in monitoring variation with time in the temperature of slag during a pyro-metallurgical operation utilising top submerged injection. The plant used was similar to that shown in FIG. 1, with a lance in accordance with FIGS. 3 and 4. The lance was fitted with a Pyrospot 44N pyrometer device available from DIAS Infrared Systems of Dresden, Germany. The slag temperature was able to be monitored to provide the continuous line shown for each of the trials. For this, the detected infrared radiation was converted to an electrical signal, with that signal passed to a recorder device. For each trial, the temperature of the slag also was measured using handheld, single measurement disposable devices at successive time intervals, to generate the diamond shaped measurements shown for each trial, with these measurements verifying the high degree of accuracy obtained with the apparatus of the invention.

Finally, it is to be understood that various alterations, modifications and/or additions may be introduced into the construction and arrangements of parts previously described without departing from the spirit or ambit of the invention.

SEQUENCE LISTING

Not Applicable.

The invention claimed is:

1. A temperature measuring apparatus for a TSL installation, for use in measuring the temperature of a molten bath that includes a slag phase, during a pyro-metallurgical operation conducted in a reactor of the installation, wherein the apparatus includes a top submerged injecting lance (herein a TSL lance) having at least an outer pipe and an inner pipe, with a bore defined by the inner pipe and an annular passage defined in part by an inner surface of the outer pipe, the TSL lance configured to inject fuel/reductant and oxygen containing gas into the molten bath causing combustion at an outlet end of the lance, and wherein the apparatus further includes an optical pyrometer device of which at least a sensor head part is mounted in relation to the TSL lance and operable both to receive infrared energy passing longitudinally within the TSL lance from the outlet end of the lance, and to focus the received infrared energy to enable generation of an output signal or display indicative of the temperature of a molten bath in which an outlet end portion of the TSL lance is submerged and from which the infrared energy is received.

2. The temperature measuring apparatus according to claim 1, where the optical pyrometer device includes a detector unit operable to receive from the sensor head the focused infrared energy and generate a corresponding electrical output signal.

3. The temperature measuring apparatus according to claim 2, wherein the detector unit is coupled to the sensor head and receives the focused infrared energy directly from the sensor head.

4. The temperature measuring apparatus according to claim 2, wherein the detector unit is external to the TSL lance and is in communication with the sensor head by a fibre optic cable.

5. The temperature measuring apparatus according to claim 3, wherein the optical pyrometer device includes an amplifier unit operable to receive the output signal from the detector unit and to generate an amplified output signal.

6. The temperature measuring apparatus according to claim 5, wherein the amplifier unit is coupled to a display device operable to provide a display indicative of the temperature the molten bath from which the infrared energy was received by the sensor unit.

7. The temperature measuring apparatus of claim 1, wherein at least the sensor head of the optical pyrometer device is mounted in relation to the TSL lance within the periphery of at least the outer pipe of the lance.

8. The temperature measuring apparatus according to claim 7, wherein at least the sensor head is within an annular passage between the outer and inner pipes.

9. The temperature measuring apparatus according to claim 7, wherein the TSL lance includes at least one intermediate pipe between the outer and inner pipes and the sensor head is between the outer pipe and a next inner-most pipe, or between two intermediate pipes, or between the inner pipe and a next outer-most pipe.

10. The temperature measuring apparatus according to claim 7, wherein the sensor head is within the periphery of the inner pipe.

11. The temperature measuring apparatus according to claim 1, wherein at least the sensor head of the optical pyrometer device is spaced from each of the inlet and outlet ends of the TSL lance.

12. The temperature measuring apparatus according to claim 11, wherein at least the sensor head is spaced from the outlet end of the lance by a minor part of the length of the lance.

13. The temperature measuring apparatus of claim 1, wherein at least the sensor head is oriented so that the sensor head has a cone axis substantially parallel with a longitudinal axis of the TSL lance.

14. The temperature measuring apparatus according to claim 1, wherein the inner pipe, and optionally any intermediate pipe, terminates short of the end of the outer pipe at the outlet end of the lance to define a mixing chamber within the outlet end portion of the lance, and the optical pyrometer device is mounted in relation to the lance at or adjacent to, such as within the bore of, the end of the inner pipe nearer to the outlet end of the lance.

15. The temperature measuring apparatus of claim 1, wherein the apparatus includes at least two said optical pyrometer devices each having at least a sensor head part mounted in relation to the TSL lance and operable to receive infrared energy passing longitudinally within the lance from said outlet end and each operable to focus infrared energy it so receives and enable generation of a respective said output signal.

16. The temperature measuring apparatus of claim 15, wherein said at least two optical pyrometer devices are mounted within the bore defined by the inner pipe.

17. The temperature measuring apparatus of claim 15, wherein at least one of said at least two optical pyrometer devices is mounted within an annular passage defined between at least one of the inner and outer pipes and an intermediate pipe between the inner and outer pipes.

18. The temperature measuring apparatus according to claim 1, wherein the TSL lance is cooled in use and thereby maintains a protective solid slag coating solely as a consequence of gas or gases injected through the lance.

19. The temperature measuring device according to claim 1, wherein the TSL lance is cooled in use and maintains a protective solid slag coating as a consequence of the combined cooling effect of gas or gases injected through the lance and circulation of coolant fluid.

* * * * *

UNITED STATES PATENT AND TRADEMARK OFFICE
CERTIFICATE OF CORRECTION

PATENT NO. : 10,018,509 B2
APPLICATION NO. : 14/783233
DATED : July 10, 2018
INVENTOR(S) : Robert W. Matusewicz et al.

It is certified that error appears in the above-identified patent and that said Letters Patent is hereby corrected as shown below:

In the Specification

Column 2, Line 1  "...know example is the Outotec..." should be -- known example is the Outotec --

Column 9, Line 15  "...or between the inner pipe a the next outer-most pipe." should be -- or between the inner pipe and the next outer-most pipe. --

Column 14, Line 8  "...may include one pyrometer devices." should be -- may include one pyrometer device. --

Column 16, Line 29  "...and maintaining protective a coating of solidified..." should be -- and maintaining a protective coating of solidified --

Column 16, Line 33  "...to enable lance 122 to be raise and lowered..." should be -- to enable lance 122 to be raised and lowered --

Column 17, Line 30  "...focussed can passes along optical fibre cable 160..." should be -- focussed can pass along optical fibre cable 160 --

Signed and Sealed this
Fourth Day of September, 2018

Andrei Iancu
*Director of the United States Patent and Trademark Office*